(12) United States Patent
Alnaimi et al.

(10) Patent No.: US 12,098,807 B2
(45) Date of Patent: Sep. 24, 2024

(54) DIGITALIZATION AND AUTOMATION OF CORROSION COUPON ANALYSIS WITH A PREDICTIVE ELEMENT

(71) Applicant: SAUDI ARABIAN OIL COMPANY, Dhahran (SA)

(72) Inventors: Rashed Alnaimi, Dhahran (SA); Bashaer Alhammad, Jubail (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 349 days.

(21) Appl. No.: 17/647,685

(22) Filed: Jan. 11, 2022

(65) Prior Publication Data
US 2023/0220957 A1    Jul. 13, 2023

(51) Int. Cl.
*F17D 5/00*     (2006.01)
*G01N 17/04*    (2006.01)

(52) U.S. Cl.
CPC .............. *F17D 5/00* (2013.01); *G01N 17/043* (2013.01)

(58) Field of Classification Search
CPC ....... F17D 5/00; G01N 17/043; G01N 17/006
USPC .......................................................... 702/86
See application file for complete search history.

(56) References Cited

U.S. PATENT DOCUMENTS

| | | | |
|---|---|---|---|
| 6,843,135 B2 | 1/2005 | Douglas et al. | |
| 2013/0304680 A1 | 11/2013 | Bailey et al. | |
| 2014/0278148 A1* | 9/2014 | Ziegel | F17D 5/005 |
| | | | 702/34 |

FOREIGN PATENT DOCUMENTS

| | | | |
|---|---|---|---|
| CN | 105069486 B | | 12/2018 |
| CN | 109477786 A | | 3/2019 |
| CN | 115482882 A | * | 12/2022 |
| GB | 2489253 A | | 9/2012 |

(Continued)

OTHER PUBLICATIONS

S. N. Hassanudin et al. "Predictive analytic dashboard for desalter and crude distillation unit," 2017 IEEE Conference on Big Data and Analytics (ICBDA), Kuching, Malaysia, 2017, pp. 55-60 (7 pages).

(Continued)

*Primary Examiner* — John H Le
(74) *Attorney, Agent, or Firm* — Osha Bergman Watanabe & Burton LLP (57) ABSTRACT

A system for determining a corrosion level of a pipeline includes a corrosion coupon received from the pipeline, a database, a first computer, a second computer, a neural network, and a third computer. The database includes existing data indicative of corrosion of a plurality of previously analyzed pipelines. The first computer receives corrosion data of the corrosion coupon and uploads the corrosion data to the database. The second computer uploads calculations performed on the corrosion data to the database. The neural network receives the corrosion data and the calculations from the database and outputs a corrosion level of the pipeline based on the corrosion data and the calculations. Further, the neural network is trained on the existing data from the plurality of previously analyzed pipelines so that the corrosion level is based on a combination of the corrosion data, the calculations, and the existing data. Finally, a third computer receives the corrosion level and generates a report of the corrosion level of the pipeline.

20 Claims, 6 Drawing Sheets

(56) References Cited

FOREIGN PATENT DOCUMENTS

KR   20200037816 A    4/2020
WO   WO-2021113673 A1 *  6/2021  ............. G01N 17/04

OTHER PUBLICATIONS

L.T. Popoola et al. "Corrosion problems during oil and gas production and its mitigation" International Journal of Industrial Chemistry, 4:35 (Aug. 2013) (16 pages).
Y. Song et al. "Effect of O2 and Temperature on Sour Corrosion" Corrosion; Jul. 1, 2012; 68 (7): 662-671 (10 pages).
Thomas B Olsson "Evaluation of corrosion in different parts of an oil refinery using corrosion coupons" Dec. 2012 (83 pages).
S. M. Al-Ghamdi et al. "Challenges in Developing, Deploying, and Transforming Online Corrosion Management Dashboards" NACE-2020-14757 (8 pages).

* cited by examiner

DIGITALIZATION AND AUTOMATION OF CORROSION COUPON ANALYSIS WITH A PREDICTIVE ELEMENT

BACKGROUND

Corrosion coupons provide an inexpensive means for monitoring low and high pressure oil and gas pipelines to determine the corrosivity of the transported oil or gas. Furthermore, corrosion coupons are typically formed from the same material as the pipeline and, thus, provide real time feedback as to how corrosion is developing in the pipeline. Therefore, by positioning a corrosion coupon within the pipeline and allowing transported fluid to pass over the surface of the corrosion coupon, the overall condition of the pipeline can be extrapolated.

However, extrapolating the health of a pipeline is typically performed by a scientist by calculating various properties of the corrosion coupon and extrapolating the health of the pipeline based on the calculated properties and personal experiences. Accordingly, any resulting determinations are subject to bias from the scientist, operator, or corrosion engineer who performs the analysis and can vary from person to person. Finally, the process of manually extrapolating a pipeline's health is inherently subject to errors from the operator due to errors in the interpretation and transmission of calculations from the scientist.

SUMMARY

A system for determining a corrosion level of a pipeline includes a corrosion coupon received from the pipeline, a database, a first computer, a second computer, a neural network, and a third computer. The database includes existing data indicative of corrosion of a plurality of previously analyzed pipelines. The first computer receives corrosion data of the corrosion coupon and uploads the corrosion data to the database. The second computer uploads calculations performed on the corrosion data to the database. The neural network receives the corrosion data and the calculations from the database and outputs a corrosion level of the pipeline based on the corrosion data and the calculations. Further, the neural network is trained on the existing data from the plurality of previously analyzed pipelines so that the corrosion level is based on a combination of the corrosion data, the calculations, and the existing data. Finally, a third computer receives the corrosion level and generates a report of the corrosion level of the pipeline.

A method for determining a corrosion level of a pipeline includes receiving a corrosion coupon from the pipeline, receiving corrosion data of the corrosion coupon, and uploading the corrosion data to a database. The database contains existing data indicative of corrosion of a plurality of previously analyzed pipelines. The method further includes uploading calculations performed on the corrosion data to the database and receiving the corrosion data and the calculations from the database. Once received, the method includes outputting a corrosion level of the pipeline by a neural network based on the corrosion data and the calculations. A report of the corrosion level of the pipeline is then generated based on the corrosion data and the calculations. The neural network is trained on the existing data from the plurality of previously analyzed pipelines so that the corrosion level is based on a combination of the corrosion data, the calculations, and the existing data.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In one aspect, embodiments disclosed herein relate to digitalizing and automating the process of analyzing corrosion coupons with a neural network in order to create a predictive model of a pipeline. The digitalization process of the analysis of corrosion coupon system is composed of two main areas, (1) an IoT framework of devices with digitalized process workflow located at a pipeline and/or laboratory, and (2) an integrated machine learning model stored in cloud storage, referenced herein as "the cloud". To process information through the two main areas, the digitalization process is separated into three steps. Initially, data from to corrosion coupons is collected and stored in a database. Next, lab users retrieve the corrosion coupon id and its data for further analysis, which is also stored in the database. Data from the database is then transferred to the neural network, where the data is processed and converted into a report including a visualization of the overall pipeline health.

Figure 1:
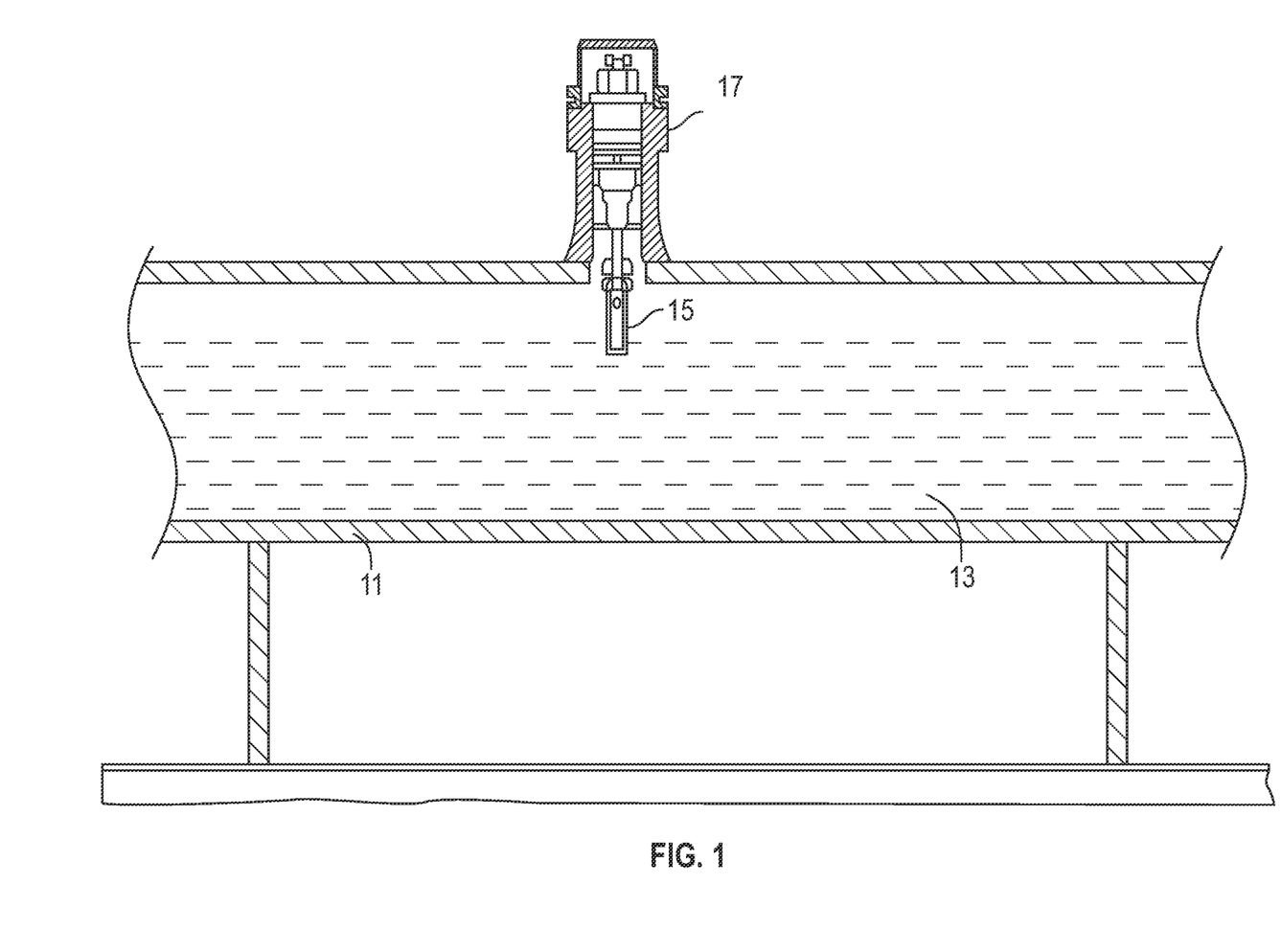
FIG. 1 shows a pipeline in accordance with one or more embodiments of the present disclosure.

FIG. 1 shows a schematic diagram illustrating a pipeline 11, and further details the process of collecting corrosion coupons. In general, pipelines may be configured in a myriad of ways. Therefore, pipeline 11 is not intended to be limiting with respect to the particular configuration of the pipeline. For example, the pipeline 11 is depicted as being on land, however the pipeline 11 may be offshore, underground, or other nonlimiting locations.

As seen in FIG. 1, corrosion of a pipeline 11 develops due to the passage of oil 13 over the interior surface of the pipeline 11. Depending upon the oxygen (O), carbon dioxide ($CO_2$), hydrogen sulfide ($H_2S$), and/or water content within the oil 13, the oil 13 may corrode the pipeline 11, causing the continued degradation of the health of the pipeline 11 due to electron transfer between the oil 13 and the pipeline 11. To analyze this, a corrosion coupon 15 formed of the same material as the pipeline 11 (e.g., steel) is attached in an access fitting 17 at a junction in the pipeline 11. The access fitting 17 is permanently fixed to the pipeline 11 and is designed to hold the corrosion coupon 15 such that oil 13 flows over the corrosion coupon 15. The corrosion coupon 15 is left in the pipeline 11 for a predetermined time (e.g., 90 days), at which time the corrosion coupon 15 is removed from the access fitting 17 by a field operator and taken to a laboratory for further analysis as depicted in FIG. 2.

Figure 2:
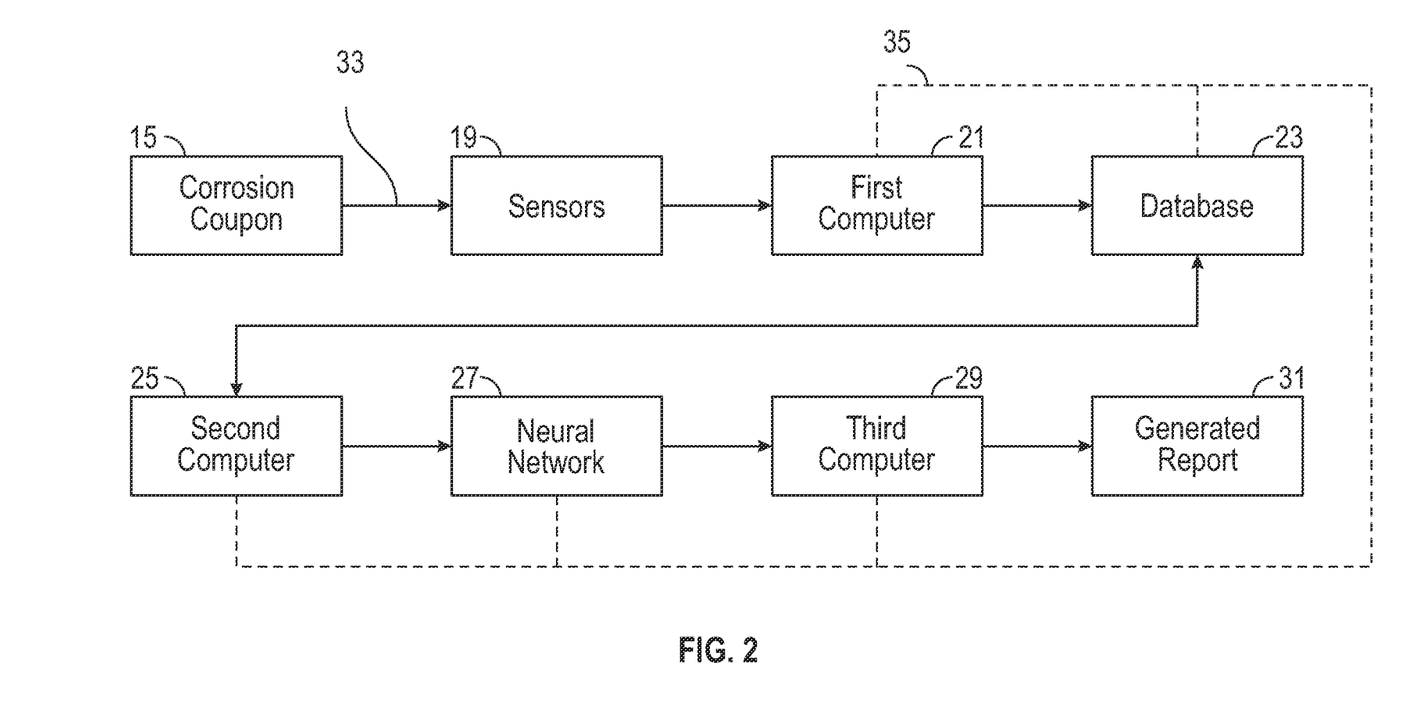
FIG. 2 shows a system overview in accordance with one or more embodiments of the present disclosure.

FIG. 2 depicts an overview of a flow corrosion data 33 to determine an overall corrosion level of the pipeline 11 based on the corrosion coupon 15. As seen in FIG. 2, corrosion data 33 is transferred from a corrosion coupon 15 with sensors 19 through an IoT framework including a first computer 21, a database 23, a second computer 25, a neural network 27, and a third computer 29, and output as a report 31. By way of example, the first computer 21, second computer 25, and third computer 29 may be a tablet, desktop computer, or a laptop, and varies according to the conditions and situations in which the computer is used. Furthermore, each computer is configured with a dashboard interface (not shown) that allows users of the computer to view the database 23, upload the corrosion data 33, and view reports from previously analyzed pipelines. Finally, the dashboard interface (not shown) allows computers to display upcoming, current, and previous maintenance, and to schedule maintenance to be completed by field operators.

To facilitate the transfer and processing of corrosion data 33, a data connection 35 links the first computer 21, database 23, second computer 25, neural network 27, and third computer 29 to form an interconnected framework of devices. The data connection 35 may be embodied as a wireless connection, such as Wi-Fi or Bluetooth, or a physical connection such as ethernet. When corrosion data 33 is not transferred manually, the transfer of corrosion data 33 is facilitated by the data connection 35.

The process of collecting corrosion data 33 from the corrosion coupon 15 involves capturing identifying information of the corrosion coupon 15. To this end, identifying information of the corrosion coupon 15 includes the pipeline 11 at which the corrosion coupon 15 is located, the duration of time the corrosion coupon 15 is disposed within the pipeline, the fluid composition and velocity of the oil 13, the material and grade of the corrosion coupon 15, and other factors, which are all captured in the corrosion data 33. Corrosion data 33 may be captured by a laboratory scientist with the aid of sensors 19 that include a scale, camera, two-dimensional and three-dimensional laser scanners, rulers, and other devices that measure or assist in measuring the physical properties of the corrosion coupon 15. Further, corrosion data 33 may be collected by corrosion engineers from schematic pipeline drawings and pipeline operation data.

Once collected, the corrosion data 33 is input into a dashboard interface of the first computer 21. Specifically, the corrosion data 33 is input into the first computer 21 and transferred to the database 23 via a data connection 35. The first computer 21 may be located at the pipeline or located in a laboratory. Once input, the corrosion data 33 is retrieved by a second computer 25 in laboratory and analyzed by a scientist to determine calculated properties of the corrosion coupon 15. The calculated properties include calculating the exposed surface area of the corrosion coupon 15 and subsequently calculating the corrosion rate (CR) of the sample, which are, in turn, appended to the corrosion data 33. Such calculations are further detailed below.

Calculating the exposed surface area of the corrosion coupon 15 is routine in the art and involves adding the surface area of each side of the corrosion coupon 15 that is exposed to the oil 13. Calculating the corrosion rate of the corrosion coupon 15 is summarized in the below formula (1), and is based on the weight lost, the alloy density, the exposed surface area, and the exposure time of the corrosion coupon 15, which are captured by a corrosion engineer.

$$CR = \frac{\text{Weight loss} * K}{\text{Alloy Density} * \text{Exposed Surface Area} * \text{Exposure Time}} \quad (1)$$

As shown, the amount of weight lost, which is calculated by weighing a corrosion coupon 15 before and after being in pipeline 11, is multiplied by a K-factor. The K-factor is used to standardize the units of the weight loss, alloy density, surface area, and exposure time measurements. The combination of the weight loss and the K-factor is then divided by the alloy density, the exposed surface area, and the exposure time of the coupon or pipeline such that the corrosion rate is expressed in units of the length of pipeline or coupon corroded per unit of time. The calculated corrosion rate is appended to the corrosion data 33 and stored on the database 23, thus completing the process of collecting corrosion data 33 from the corrosion coupon 15.

Once collected, data from the database 23 is analyzed by a neural network 27. In the examples described herein, the neural network 27 is located in the cloud. However, the neural network 27 may be located on the first computer 21, second computer 25, or third computer 29 without departing from the spirit of the invention due to interconnection between these elements as facilitated by the data connection 35. As discussed below, the neural network receives the corrosion data 33 for the corrosion coupon 15 of the pipeline 11 from the database 23 and outputs an overall grade of the pipeline 11, which indicates the severity of corrosion of the pipeline as a "low," "medium," or "high" level of corrosion.

Figure 3:
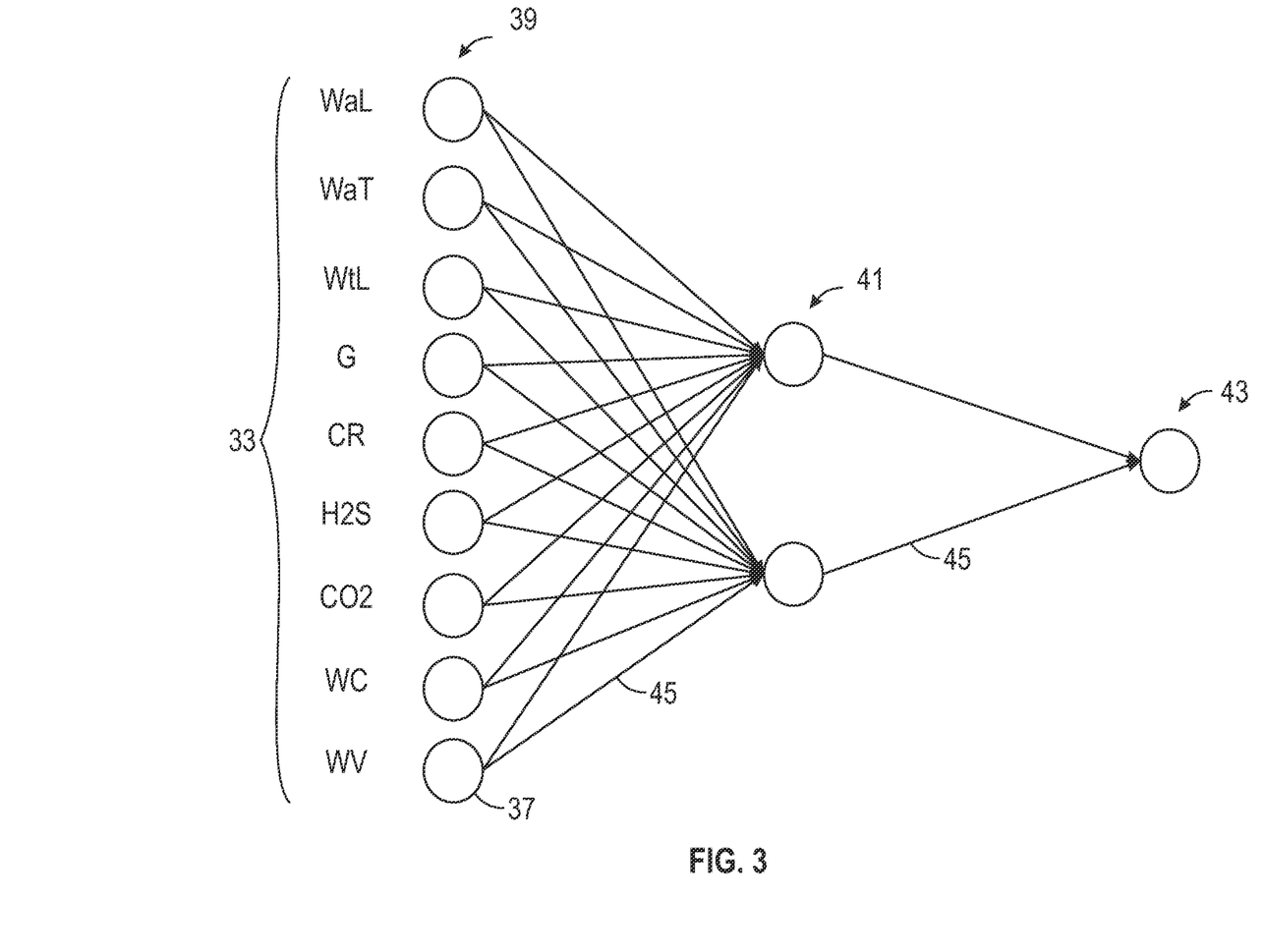
FIG. 3 shows an apparatus in accordance with one or more embodiments of the present disclosure.

One example of a neural network 27 as described herein is depicted in FIG. 3. As seen in FIG. 3, the input layer 39 receives inputs 37 that categorically correspond to data values stored in the corrosion data 33. Examples of inputs 37 include the wall loss (WaL), the wall thickness (WaT), the weight loss of the coupon (WtL), the material grade and density (G), the corrosion rate (CR), the hydrogen sulfide content ($H_2S$) of the pipeline, the carbon dioxide content ($CO_2$) of the pipeline, the water cut (WC), which expresses the ratio of water volume to the total liquid volume in the pipeline, and the water velocity (WV) of the pipeline. The aforementioned example inputs are not intended to be limiting or all-encompassing and are provided to further enhance the description of the neural network 27. Each input is received in the input layer 39, where the inputs 37 are processed by a hidden layer 41 and an output layer 43.

During the transfer of the inputs 37 from the input layer 39 to the output layer 43, the inputs 37 are weighted and grouped into two deterministic factors, or neurons, that form the hidden layer 41. By way of example, the neurons within the hidden layer 41 may be directed towards (1) a correlation of the weight of material lost in the corrosion, the grade of material, material lost, and the chemical composition of the oil, and (2) a correlation of the amount of time that the corrosion coupon 15 was in the pipeline, the corroded surface area of the corrosion coupon 15, and the chemical composition of the oil 13. With the combination of factors (1) and (2), above, the output layer 43 determines the overall grade of the pipeline, and outputs an overall grade of "low", "medium", or "high" severity, and outputs this determination to the database 23. The overall grades of "low", "medium", and "high" severity are relative metrics that correspond to a corrosion rate as specified in formula (1). That is, a "low" severity grade represents that a pipeline has a lower corrosion rate than a corresponding "high" severity grade pipeline.

In order to train the neural network 27, the database 23 contains existing data from multiple other pipelines collected over a number of years by substantially similar methods. This existing data, which matches the structure of the corrosion data 33, is subdivided into an 80% subset for training the neural network 27 and a 20% subset for testing the neural network 27. The subsets are each composed of random data samples from the existing data and are varied as much as possible to avoid overfitting the neural network 27 to the existing data. During the training process, data from the training subset is fed into the neural network 27, multiplied by weights 45, and processed by the hidden layer 41 and the output layer 43. Results from the output layer 43 are used to adjust the weights 45 with backpropagation, as is commonly known in the art. Further, initial grades of "low", "medium", and "high" severity may be assigned by an operator to the existing data such that the neural network 27 learns the proper severity classification of multiple pipelines.

Next, the neural network 27 is validated against the testing subset. Specifically, values of the testing subset are fed into the neural network 27; the outcome determined by the output layer 43 is compared to the known outcome of the pipeline specified in the testing subset. If the neural network 27 fails to accurately predict the pipeline after testing, biases may be applied to the weights 45 and inputs 37 of the existing data, at which point the neural network 27 is retrained on the existing data until the neural network 27 accurately predicts the severity of the pipeline based upon the testing data. Alternatively, the weights may be adjusted according to other processes such as heuristic functions, hill climbing algorithms, gradient learning algorithms, or other methods of tuning the weights to the inputs 37 and outputs without departing from the spirit of the invention.

Alternatively, the neural network 27 may determine the severity of the pipeline 11 by analyzing captured images of the corrosion coupon 15. In such cases, a scientist captures images of the corrosion coupon 15 at the pipeline 11 with the first computer 21 and uploads the images to the database 23. The neural network 27 is then trained on images of other pipelines in the database 23 and learns to correlate the images from the database 23 with their corresponding corrosion coupon data. New images, which form the corrosion data 33, are compared by the neural network 27 to other images on the database 23, and the neural network 27 computes the corrosion level of the pipeline 11 by assuming that the severity of pipelines with corrosion coupons that are similar to the corrosion coupon 15 is the severity of the pipeline 11. As such, this method advantageously avoids the necessity of inputting multiple parameters of the pipeline's chemical composition and the properties of the corrosion coupon 15, and instead is dependent solely upon the images of the corrosion coupon 15.

Returning to FIG. 2, after receiving the severity of the pipeline from the output layer 43, the corrosion level is transferred to the database 23 and the third computer 29, where a report 31 is generated. The report 31 includes information detailing each input 37, the corrosion level of the pipeline, and a graphic visualization of the pipeline based upon the existing data. For example, the graphic visualization may include a graphics interchange format (GIF) video of the predicted pipeline degradation, or images from pipelines that have received the same severity grade. Furthermore, the report 31 includes recommendations as to when sections of the pipeline require maintenance, cleaning, repair, or replacement. The recommendations may be output to the first computer 21, the second computer 25, and the dashboard interface such that field operators, scientists, or maintenance personnel perform the recommended maintenance according to the recommended maintenance specified by the report 31.

Figure 4:
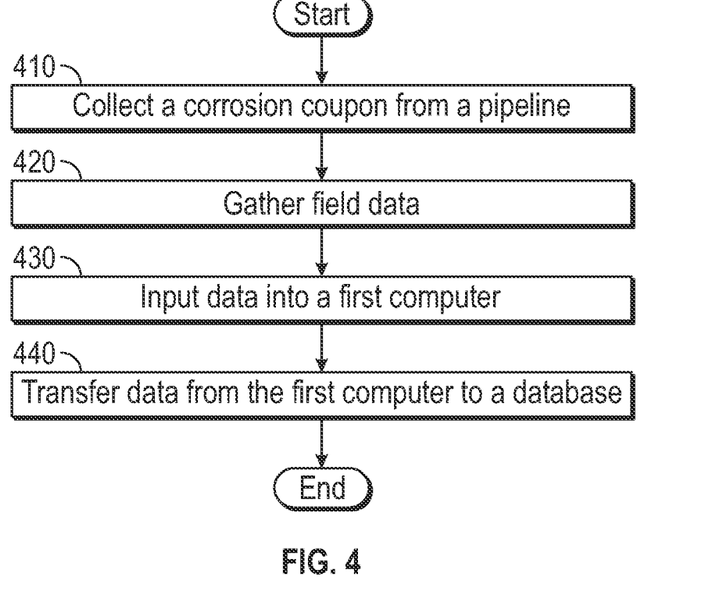
FIG. 4 shows a flowchart of a method in accordance with one or more embodiments of the present disclosure.
Figure 5:
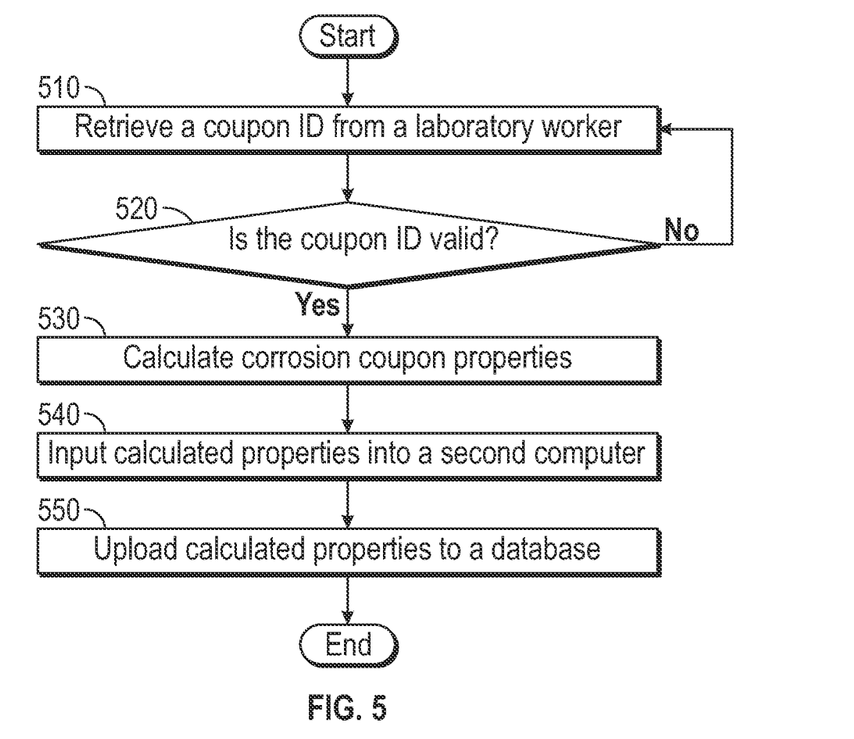
FIG. 5 shows a flowchart of a method in accordance with one or more embodiments of the present disclosure.
Figure 6:
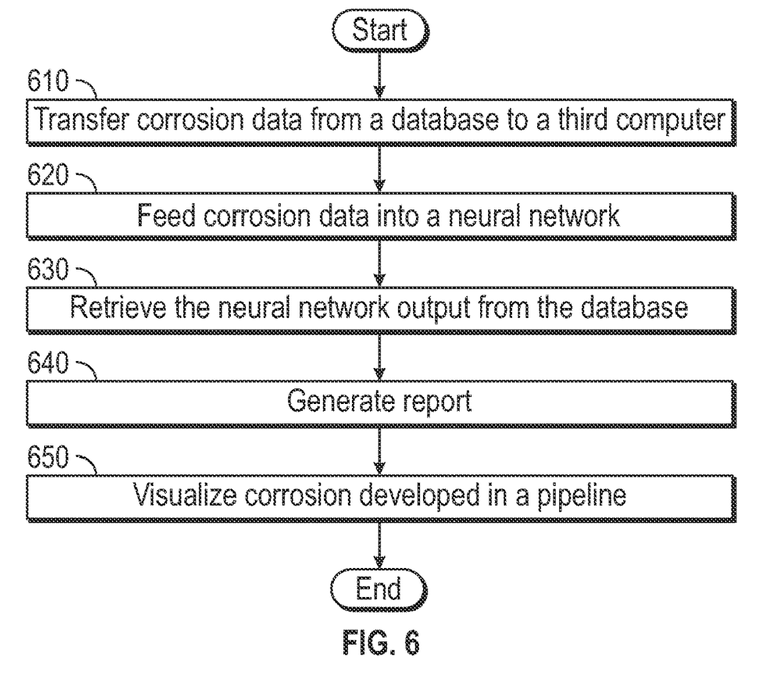
FIG. 6 shows a flowchart of a method in accordance with one or more embodiments of the present disclosure.

FIGS. 4-6 depict, in multiple parts, the operational sequence of removing a corrosion coupon 15 from a pipeline 11, analyzing the corrosion coupon 15, and generating a report 31 from the corrosion coupon 15.

Specifically, FIG. 4 depicts a method of collecting corrosion data 33. In block 410, a corrosion coupon 15 is collected from the pipeline 11 by a field operator by removing the corrosion coupon 15 from an access fitting 17. The access fitting 17 is a section of the pipeline specifically designed to hold the corrosion coupon 15 as oil 13 flows over the corrosion coupon 15. Further, the corrosion coupon 15 is formed of the same material (e.g., carbon steel or stainless steel) as the pipeline 11.

In block 420, corrosion data 33 is gathered by a scientist or corrosion engineer. The corrosion data 33 includes the weight and exposed surface area of the corrosion coupon 15, which are obtained by sensors 19 such as a scale, ruler, camera, and other assistive aids. Furthermore, the corrosion data 33 gathered also includes a coupon ID of the corrosion coupon 15, which may be etched onto the surface of the corrosion coupon 15. In block 430, this corrosion data 33 is manually input into the first computer 21 by the scientist. Finally, in block 440 the corrosion data 33 is transferred from the first computer 21 to the database 23, where the corrosion data 33 is further analyzed by a scientist at the second computer 25, as detailed in FIG. 5.

FIG. 5 depicts a method of processing the corrosion data 33 from the database 23, which is performed by a scientist at a second computer 25 in a laboratory. Initially, in block 510, a scientist enters the coupon ID of the corrosion coupon 15 into the database 23 via a second computer 25 that is connected to the database 23 via a data connection 35. In block 520, the database 23 determines if the coupon ID is valid by comparing the coupon ID to coupon IDs stored in the database 23. If the coupon ID is not present in the database 23, the second computer 25 prompts the scientist to re-enter the coupon ID. If the coupon ID matches a coupon ID in the database 23, the database 23 returns all corrosion data 33 associated with the coupon ID. This corrosion data 33 includes the material grade, dimensions, and weight of the corrosion coupon 15, as well as the hydrogen sulfide ($H_2S$), carbon dioxide ($CO_2$), and water content of the pipeline 11.

In block 530, properties of the corrosion coupon 15 are calculated by the scientist. Specifically, the scientist calculates the exposed surface area and corrosion rate (e.g., calculated by Formula (1), above) of the corrosion coupon 15. In block 540, the calculated properties are appended to the corrosion data 33 by manually entering the calculated properties into the corrosion data 33 via the second computer 25. Finally, in block 550, the corrosion data 33 is uploaded from the second computer 25 to the database 23 via a data connection 35, which may be a physical connection such as ethernet, or a wireless connection such as Wi-Fi or Bluetooth.

FIG. 6 depicts the operational method of generating a corrosion rate report. Specifically, in block 610 corrosion data 33 is transferred from a database 23 to a third computer 29. The corrosion data 33 includes data gathered by a corrosion engineer from a corrosion coupon 15 taken from a pipeline 11, as well as any appended calculated properties of the corrosion coupon 15. The constituent values of the corrosion data 33 are fed into an input layer 39 of a neural network 27 in block 620. In particular, the corrosion data 33 is split into the categories of wall loss (WaL), wall thickness (WaT), weight loss of the coupon (WtL), material grade (G) of the coupon, corrosion rate (CR), hydrogen sulfide content ($H_2S$), carbon dioxide content ($CO_2$), water cut (WC), and the water velocity (WV) in the pipeline. The neural network 27 proceeds to assign an overall pipeline grade of "low", "medium", or "high" level of corrosion in the pipeline as its output at the output layer 43, which is in turn stored in the database 23.

In block 630, the output pipeline grade from the neural network 27 is retrieved by the third computer 29 from the database 23. In block 640, the output data is converted, by a third computer 29, into a report 31 containing the corrosion data 33, the output pipeline corrosion level, and maintenance recommendations according to the corrosion data 33 and corrosion level. Subsequently, in block 640, a visualization of corrosion in the pipeline 11 is created by the third computer 29 by creating a GIF visualization of the corrosion rate in the pipeline 11 according to the corrosion data 33 and corrosion level specified in the report 31.

Figure 7:
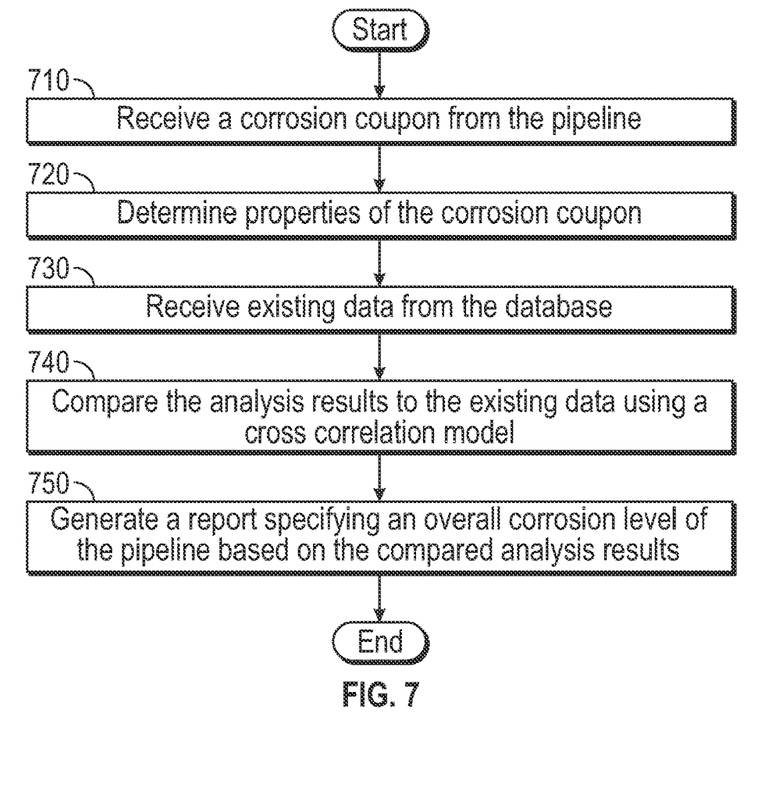
FIG. 7 shows a flowchart of a method in accordance with one or more embodiments of the present disclosure.

FIG. 7 depicts an alternative method of analyzing a corrosion coupon 15 from a pipeline 11 without the use of a neural network 27 and a third computer 29.

In block 710, the corrosion coupon 15 is retrieved by a field operator from a pipeline 11. This may be achieved by removing a cap of an access fitting 17 that contains the corrosion coupon 15 and taking the corrosion coupon 15 to a workstation at the pipeline 11 for further analysis.

In block 720, the properties of the corrosion coupon 15 are determined. Specifically, a scientist calculates the corrosion rate, exposed surface area, and material properties of the corrosion coupon 15, called corrosion data 33, according to processes discussed above. These properties are input into a first computer 21 or second computer 25 by the scientist through the use of a dashboard interface of the first computer 21 and the second computer 25 for further use.

In block 730, the second computer 25 retrieves existing data from a plurality of pipelines from the database 23. Specifically, the existing data includes multiple years of data from a plurality of pipelines that is categorically substantially similar to the corrosion data 33 collected from the corrosion coupon 15 such that variables such as wall loss and wall thickness present in the corrosion data 33 are reflected in the existing data. The reception downloading process is completed by a data connection 35, and the corrosion data 33 may be wirelessly or physically downloaded.

In block 740, the corrosion data 33 is fit to the existing data from the database 23 through the use of a cross-correlation model. In a cross-correlation model, the corrosion data 33 is compared to the existing data, and a correlation score is computed between each dataset, or pipeline, in the existing data and the corrosion data 33. Once the closest dataset in the existing data is determined according to the correlation score, the severity of the pipeline in the closest dataset is assumed to be the severity of the pipeline 11 from which the corrosion coupon 15 was pulled. On the other hand, if two or more similar scores are uncovered, the most occurring or most probable severity grade is assumed to be the severity of the pipeline 11. The severity is appended to the corrosion data 33, and the corrosion data 33 is uploaded to the database 23. Thus, the database 23 may be flexibly accessed by multiple computers, and analysis results may be viewed by any computer capable of communicating with the database 23. For example, analysis results may be viewed in real time at the pipeline via a tablet computer operated by a field operator, or viewed in a laboratory by a corrosion engineer.

In block 750, a report 31 is generated according to the corrosion data 33. The report 31 includes the corrosion data 33, the existing dataset or datasets that are closest to the corrosion data 33, and the assumed pipeline severity grade. In conjunction, images of the previously analyzed pipelines are placed in the report 31, such that the overall severity of the pipeline 11 is visualized with similar pipeline examples. In accordance with the report 31, the second computer 25 schedules maintenance of the pipeline 11 automatically, by presenting notifications to field operators, scientists, and maintenance personnel that include the maintenance required and the recommended date of occurrence thereof. Furthermore, the second computer 25 reminds the field operators, scientists, and/or maintenance personnel on said date to perform the maintenance via a notification, and, thus, the second computer 25 facilitates the maintenance of the pipeline according to the report 31.

Figure 8:
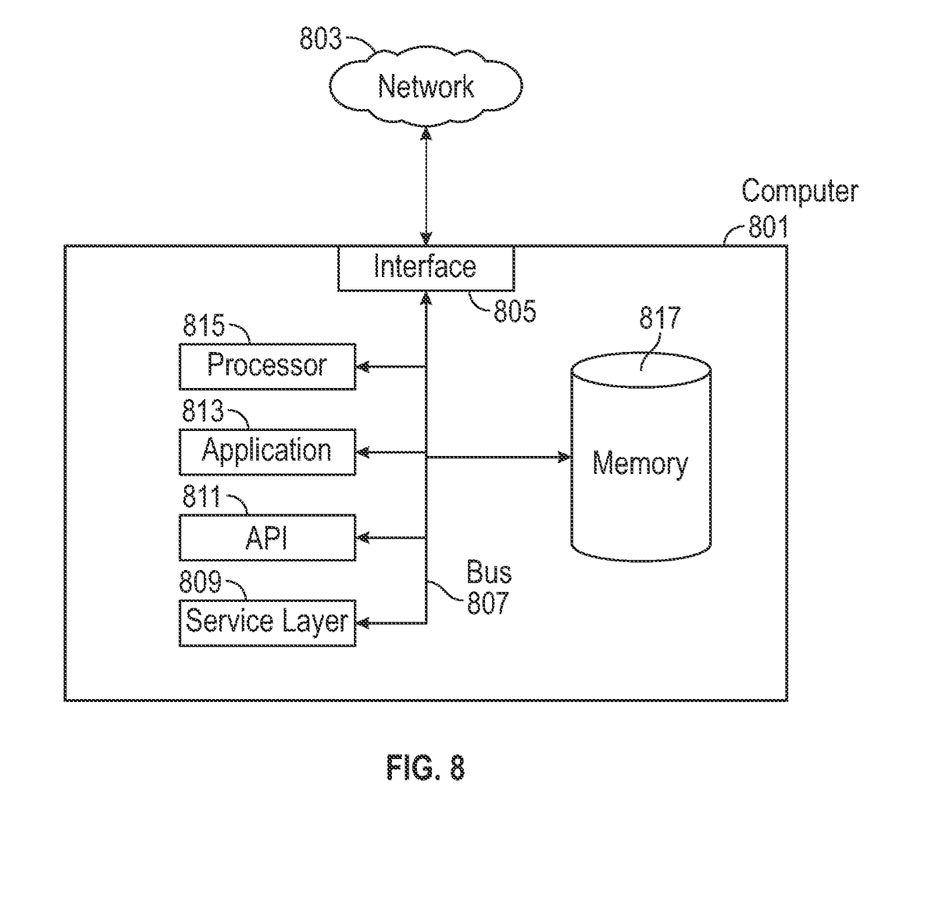
FIG. 8 shows a computer system in accordance with one or more embodiments of the present disclosure.

Embodiments as described herein may be implemented on a computer system as depicted in FIG. 8. Specifically, FIG. 8 is a block diagram of a computer system 801 used to provide computational functionalities associated with described algorithms, methods, functions, processes, flows, and procedures as described in the instant disclosure. That is, elements as depicted in FIG. 8 and described herein are described to be representative of the dashboard interface, the first computer 21, the second computer 25, and the third computer 29, as well as the neural network 27, database 23, and data connection 35. Furthermore, the illustrated computer 801 is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Finally, the computer 801 may include a computer that includes an input device, such as a keypad, keyboard, touch screen, or other device that accepts user information, and an output device that conveys information associated with the operation of the computer 801, including digital data, visual, or audio information (or a combination of information), or a GUI.

The computer 801 may serve in a role as a client, network component, a server, a database or other persistency, or any other component (or a combination of roles) of a computer system for performing the subject matter described in the instant disclosure. As illustrated, the computer 801 is communicably coupled with a network 803. In some implementations, one or more components of the computer 801 are configured to operate within environments, including cloud-computing-based, local, global, or other environment (or a combination of environments).

The computer 801 receives requests over a network 803 from a client application (e.g., the dashboard interface) and responds to the received requests by processing said requests in an appropriate software application. In addition, requests may also be sent to the computer 801 from internal users (e.g., via the dashboard interface), external or third-parties, other automated applications, as well as any other appropriate entities, individuals, systems, or computers.

Each of the components of the computer 801 are interconnected using a system bus 807. In some implementations, any or all components of the computer 801, including both hardware or software, may interface with each other and/or the interface 805 the system bus 807 using an application programming interface (API) 811, a service layer 809, or a combination thereof. The API 811 includes specifications for routines, data structures, and object classes, and may be computer-language independent or dependent and, thus, refer to a complete interface, a single function, or even a set of APIs.

The service layer 809 provides software services to the computer 801 or other components that are communicably coupled to the computer 801. The functionality of the computer 801 is accessible for all service consumers using this service layer. Software services, such as those provided by the service layer 809, provide reusable, defined business functionalities through a defined interface. For example, the interface may be software written in JAVA, C++, or other suitable language providing data in extensible markup language (XML) format or other suitable format.

The computer 801 includes an interface 805. Although illustrated as a single interface 805 in FIG. 8, two or more interfaces 805 may be used according to particular needs, desires, or particular implementations of the computer 801. The interface 805 (e.g., a dashboard interface) is used by the computer 801 for communicating with other systems in a distributed environment that are connected to the network 803. Generally, the interface 805 includes logic encoded in software or hardware (or a combination of software and hardware) and operable to communicate with the network 803. More specifically, the interface 805 may include software supporting one or more communication protocols associated with communications such that the network 803 or interface's hardware is operable to communicate physical signals within and outside of the illustrated computer 801.

The computer 801 includes at least one computer processor 815. Although illustrated as a single computer processor 815 in FIG. 8, two or more processors may be used according to particular needs, desires, or particular implementations of the computer 801. Generally, the computer processor 815 executes instructions and manipulates data to perform the operations of the computer 801 and any algorithms, methods, functions, processes, flows, and procedures as described in the instant disclosure.

The computer 801 also includes a memory 817 that holds data for the computer 801 and/or other components that are connected to the network 803. For example, the memory 817 is a database storing data consistent with this disclosure. Although illustrated as a single memory 817 in FIG. 8, two or more memories may be used according to particular needs, desires, or particular implementations of the computer 801 and the described functionality. While memory 817 is illustrated as an integral component of the computer 801, in alternative implementations, memory 817 may be external to the computer 801.

The application 813 is an algorithmic software engine providing functionality according to particular needs, desires, or particular implementations of the computer 801, particularly with respect to functionalities described within this disclosure. For example, application 813 serves as one or more components, modules, applications, etc. Further, although illustrated as a single application 813, the application 813 may be implemented as multiple applications 813 on the computer 801. In addition, although illustrated as integral to the computer 801, in alternative implementations the application 813 may be external to the computer 801.

In some embodiments, the computer 801 is implemented as part of a cloud computing system. For example, a cloud computing system may include one or more remote servers along with various other cloud components such as cloud storage units and edge servers. In particular, a cloud computing system may perform one or more computing operations without direct active management by a user device or local computer system. As such, a cloud computing system may have different functions distributed over multiple locations from a central server that is performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

There may be any number of computers 801 associated with, or external to, a computer system containing the computer 801 and each computer 801 communicating over network 803. Further, the term "client," "user," and other appropriate terminology may be used interchangeably as appropriate without departing from the scope of this disclosure. Moreover, this disclosure contemplates that many users may use one computer 801, or that one user may use multiple computers 801.

Accordingly, embodiments disclosed herein provide the advantage of automatically extrapolating a pipeline health according to data collected from corrosion coupons. In particular, by analyzing the corrosion coupon data with a neural network personal biases may be removed from the extrapolation process. Furthermore, by using a centralized database to store data from multiple pipelines, new data is compared to the entire history of available data without a corresponding increase in processing time. Moreover, by forming an integrated network of devices the information can be flexibly accessed by the field operators, scientists, and corrosion engineers regardless of the location of the computer. Finally, embodiments disclosed herein avoid errors introduced during the extrapolation process and provide an objective way to determine required pipeline maintenance.

Although only a few example embodiments have been described in detail above, those skilled in the art will readily appreciate that many modifications are possible in the example embodiments without materially departing from this invention. For example, although measurements of the corrosion coupon are performed by a scientist, the measurement process can be automated. Furthermore, although the neural network is configured to output a severity grade, it is envisaged that the neural network outputs a specific corrosion rate of a corrosion coupon. Finally, although the system is split across three computers, the system may be performed using only a single computer. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke AIA 35 U.S.C. § 112(f) for any limitations of any of the claims herein, except for those in which the claim expressly uses the words 'means for' together with an associated function.

What is claimed is:

1. A system for determining a corrosion level of a pipeline, the system comprising:
   a corrosion coupon received from the pipeline;
   at least one sensor configured to capture corrosion data from the corrosion coupon;
   a database comprising existing data indicative of corrosion of a plurality of previously analyzed pipelines;
   a first computer configured to receive the corrosion data from the at least one sensor and upload the corrosion data to the database;
   a second computer configured to upload calculations performed on the corrosion data to the database;
   a neural network configured to receive the corrosion data and the calculations from the database and output a corrosion level of the pipeline based on the corrosion data and the calculations; and
   a third computer configured to:
      receive the corrosion level of the pipeline,
      generate a report of the corrosion level of the pipeline, the report comprising a recommended maintenance to mitigate the corrosion of the pipeline based upon the corrosion level of the pipeline,
   wherein the neural network is trained on the existing data from the plurality of previously analyzed pipelines such that the corrosion level is based on a combination of the corrosion data, the calculations, and the existing data, and
   wherein the second computer is further configured to send an automated notification in real time for a field operator to perform the recommended maintenance.

2. The system of claim 1, wherein the second computer is configured to retrieve the corrosion data from the database.

3. The system of claim 1, wherein the corrosion level indicates a low, medium, or high level of corrosion in the pipeline.

4. The system of claim 1, wherein the first computer, the second computer, the third computer, the database, and the neural network are interconnected with a data connection to form a network.

5. The system of claim 1, wherein the neural network is located in cloud storage.

6. The system of claim 1, wherein the calculations received by the second computer include an exposed surface area and a corrosion rate of the corrosion coupon.

7. The system of claim 1, wherein the corrosion data includes the pipeline at which the corrosion coupon is located, a duration of time the corrosion coupon is within the pipeline, a composition and a velocity of a fluid in the pipeline, and a material of the corrosion coupon.

8. The system of claim 1, wherein the existing data categorically corresponds to the corrosion data such that the existing data contains variables that correspond to variables in the corrosion data.

9. The system of claim 1, wherein the report contains a visualization generated by the third computer of a predicted degradation of the pipeline according to the corrosion level.

10. The system of claim 1, wherein the notification indicates when the recommended maintenance on the pipeline is required according to the corrosion level of the pipeline.

11. The system of claim 1, wherein the recommended maintenance comprises one or more of:
    cleaning a section of the pipeline;
    repairing the section of the pipeline, and
    replacing the section of the pipeline.

12. A method for determining a corrosion level of a pipeline, the method comprising:
    receiving a corrosion coupon from the pipeline;
    capturing, using at least one sensor, corrosion data from the corrosion coupon;
    uploading the corrosion data to a database that contains existing data indicative of corrosion of a plurality of previously analyzed pipelines;
    uploading calculations performed on the corrosion data to the database;
    receiving the corrosion data and the calculations from the database;
    outputting, by a neural network, a corrosion level of the pipeline based on the corrosion data and the calculations;
    generating a report of the corrosion level of the pipeline based on the corrosion data and the calculations, the report comprising a recommended maintenance to mitigate the corrosion of the pipeline based upon the corrosion level of the pipeline; and
    sending an automated notification in real time for a field operator to perform the recommended maintenance;
    wherein the neural network is trained on the existing data from the plurality of previously analyzed pipelines such that the corrosion level is based on a combination of the corrosion data, the calculations, and the existing data.

13. The method of claim 12, further comprising uploading the corrosion data to the database at the pipeline.

14. The method of claim 12, wherein the corrosion level indicates a low, medium, or high level of corrosion in the pipeline.

15. The method of claim 12, further comprising calculating an exposed surface area and a corrosion rate of the corrosion coupon.

16. The method of claim 12, wherein the existing data categorically corresponds to the corrosion data such that the existing data contains variables that correspond to variables in the corrosion data.

17. The method of claim 12, further comprising generating a visualization of a predicted degradation of the pipeline according to the corrosion level.

18. The method of claim 12, further comprising generating a notification indicating when the recommended maintenance on the pipeline is required according to the corrosion level of the pipeline.

19. The method of claim 12, further comprising interconnecting a first computer, a second computer, a third computer, the neural network, and the database with a data connection such that the corrosion data is processed with an interconnected framework of devices.

20. The method of claim 12, wherein the recommended maintenance comprises one or more of:
   cleaning a section of the pipeline;
   repairing the section of the pipeline, and
   replacing the section of the pipeline.

* * * * *